United States Patent
Hellsten et al.

(10) Patent No.: US 9,513,536 B2
(45) Date of Patent: Dec. 6, 2016

(54) CAMERA RIG

(71) Applicant: Easyrig AB, Umeå (SE)

(72) Inventors: Johan Hellsten, Umeå (SE); Robert Olofsson, Umeå (SE)

(73) Assignee: EASYRIG AB (SE)

( * ) Notice: Subject to any disclaimer, the term of this patent is extended or adjusted under 35 U.S.C. 154(b) by 0 days.

(21) Appl. No.: 15/054,832

(22) Filed: Feb. 26, 2016

(65) Prior Publication Data

US 2016/0259228 A1    Sep. 8, 2016

(30) Foreign Application Priority Data

Mar. 2, 2015    (EP) .................................... 15157184

(51) Int. Cl.
*G03B 17/56* (2006.01)
*G02B 7/00* (2006.01)
*F16M 13/04* (2006.01)

(52) U.S. Cl.
CPC ............ *G03B 17/561* (2013.01); *F16M 13/04* (2013.01); *G02B 7/001* (2013.01); *G02B 7/002* (2013.01)

(58) Field of Classification Search
CPC ....... G03B 17/561; F16M 11/24; F16M 13/04; A45F 3/14
See application file for complete search history.

(56) References Cited

U.S. PATENT DOCUMENTS

| | | | | |
|---|---|---|---|---|
| 3,044,346 A * | 7/1962 | Fieux | ..................... | F16M 11/10 248/325 |
| 3,900,140 A * | 8/1975 | Kelso | ..................... | F16M 13/04 224/185 |
| 4,037,763 A * | 7/1977 | Turchen | ................. | F16M 13/04 224/153 |
| 4,206,983 A * | 6/1980 | Nettman | ................... | A45F 3/10 224/201 |
| 4,247,067 A * | 1/1981 | Smith | .................... | F16M 13/04 248/123.11 |
| 2006/0126167 A1 | 6/2006 | Piontkowski | | |
| 2010/0006611 A1* | 1/2010 | Knowles | ................... | A45F 3/14 224/257 |
| 2011/0264014 A1* | 10/2011 | Angold | .................... | B66D 3/18 601/35 |

(Continued)

FOREIGN PATENT DOCUMENTS

EP    0 723 368 A2    7/1996
SE    501 879 C2    6/1995

(Continued)

*Primary Examiner* — W B Perkey
(74) *Attorney, Agent, or Firm* — Condo Roccia Koptiw LLP

(57) ABSTRACT

A device comprising a harness, an arm, and an extendable string. The arm may include a first portion being fixed in relation to the harness and a second portion for supporting of the string. The string may include a first portion and a second portion, the first portion of the string being arranged for fastening of an optical instrument. The device may include an adjustable counter force device, and the second portion of the string may be attached to the adjustable counter force device for providing a counter force on the string. The adjustable counter force device may include a spring, a lever arm, and a support. The counter force exerted by the counter force device on the string may be adjustable.

19 Claims, 3 Drawing Sheets

(56) References Cited

U.S. PATENT DOCUMENTS

| | | | | |
|---|---|---|---|---|
| 2014/0339382 A1* | 11/2014 | Steubing | ............... | F16M 13/04 |
| | | | | 248/128 |
| 2015/0375020 A1* | 12/2015 | Palet | .................. | E04G 21/3204 |
| | | | | 248/542 |
| 2016/0209732 A1* | 7/2016 | Liang | .................. | G03B 17/561 |

FOREIGN PATENT DOCUMENTS

| | | |
|---|---|---|
| SU | 1 525 665 A1 | 11/1989 |
| WO | WO 95/25926 A1 | 9/1995 |

\* cited by examiner

CAMERA RIG

CROSS REFERENCE TO RELATED APPLICATIONS

This application claims the benefit under 35 U.S.C. §119 to European Patent Application No. 15157184.1, filed Mar. 2, 2015, the contents of which are hereby incorporated by reference in their entirety.

TECHNICAL FIELD

The present disclosure relates to a device for carrying an optical instrument, a use of the device, and to a camera system.

BACKGROUND

With hand held devices, such as tools or cameras, the user or holder of the device often suffers from the weight of the device. Both short term problems such as tiring of muscles and long term problems such as wear to the body of the user is frequently experienced by the users. Rigs for carrying of devices are available, which takes up the weight of the device and distributes the weight in a suitable way to the body of the carrier.

In the Swedish patent with number 501 879, a device for carrying the weight of, for example, a camera is disclosed. The device disclosed therein is suitable for carrying of a camera with a certain predetermined weight but not for different cameras with a wide range of weights. If the user changes from one camera to another camera with a different weight, the device may have to be rebuilt or exchanged with a new device adapted for the new weight.

It is desirable with a single device that efficiently can support a wide range of weights of optical instruments, such as, for example with cameras, the weight of a smaller light-weight camera but also the weight of a larger heavy camera, with maintained efficient support of the weight. It is further desirable that the device provides a high freedom to move and operate, for example, the camera.

SUMMARY OF THE INVENTION

An object of the present invention is to provide an efficient device for carrying instruments, such as optical instruments.

Another object of the present invention is to provide an efficient device for carrying a camera.

Yet another object is to provide an efficient device for efficient carrying of optical instruments, such as a camera, which device efficiently can handle a wide range of different weights of the optical instrument.

Other objects of the present invention include providing solutions to identified problems, and to improve techniques, with regard to prior art. According to a first aspect, there is provided a device for carrying an optical instrument, the device comprising a harness, an arm, and an extendable string. The arm may include a first portion being fixed in relation to the harness, and a second portion for supporting of the string. The string may include a first portion and a second portion, and the first portion of the string may be arranged for fastening of an optical instrument. The device may further include an adjustable counter force device, and the second portion of the string may be attached to the adjustable counter force device for providing a counter force on the string. For example, the adjustable counter force device may include a spring, a lever arm, and a support. The lever arm may include a first point pivotably attached to the support, a second point attached to the string, and a third point attached to a second point of the spring. For example, a first point of the spring may be pivotably attached to the support. The second point and/or the third point of the lever arm may be movable along the lever arm such that a counter force exerted by the counter force device on the string is adjustable.

Being described as being fixed in relation to the harness is intended to include both that the arm is attached or fixed directly to the harness as well as indirectly such as by being fixed to any means or device which facilitates attachment to the harness.

When described herein, the string comprising a first portion being arranged for fastening of an optical instrument is intended to include that the string is directly fastened or attached to the optical instrument, and that the string is fasten by any suitable means to the optical instrument.

The support may be, for example, a plate, or any other suitable structure, to which the spring and the lever arm may be attached.

The harness is an efficient means for carrying the weight of an optical instrument, for example, a camera.

The arm is an efficient means for supporting of an object such as an optical instrument, such as a camera. The arm, being fixed in relation to the harness, transfers weight from the object to the shoulders and/or hips of a user of the device, thus, also heavy objects may be efficiently carried by the user.

The extendable string allows efficient manoeuvring of an optical instrument fastened to the string, and the extendable string may efficiently provide for a counterforce on an object fastened to the string, such as an optical instrument, for example a camera. Further, the carried optical instrument can be moved and changed in position due to the extendibility of the string.

The adjustable counter force device provides a counter force to an object fastened to the string, such that the object, for example, may be lifted from a lower level to a higher level by a user without requiring a high lifting force by the user, and the object may be lowered from a higher level by the user and then returned to the higher level assisted by the counter force.

The spring efficiently provides a counter force to the string and any object fastened to the string. Further, the spring efficiently allows the string to be extendable, and retractable, and, thus, allow an object fastened to the string to be efficiently maneuvered and handled.

The lever arm efficiently allows the counter force and the counter force device to be adjustable, and thus allows the device for carrying an optical instrument to be suitable and adjusted for a plurality of different weights of optical instruments.

The second point of the lever arm may be movable along the lever arm such that the counter force exerted by the counter force device on the string is adjustable.

The third point of the lever arm may be movable along the lever arm such that a counter force exerted by the counter force device on the string is adjustable.

The third point of the lever arm may be positioned between the first and the second point of the lever arm.

The adjustable counter force device may further comprise a pulley system comprising at least one wheel through which pulley system the string runs. Thereby the extendable length of the string may be increased more than the spring is extended or compressed. Thus, the freedom to move an optical instrument, such as a camera, fastened to the string is increased. Further, compression or extension of the spring is kept small relative to the extension of the line, and the size of the counter force device may be minimised or kept small.

The pulley system may comprise two or more wheels.

Such a pulley system may be, for example, what may be referred to as a double tackle, providing a mechanical advantage of four.

At least one of the at least one wheels may be rotatably attached to the second point of the lever arm.

The string may be attached to the second point of the lever arm by means of a wheel attached to the second point of the lever arm wherein the string is positioned in a groove circumfering (e.g., encompassing) the wheel such that the wheel may be rotated when the string is extended or retracted.

The spring may be a gas spring.

The spring may be an extension spring or a compression spring.

The second point and/or the third point of the lever arm may be movable, for example by means of threads.

The second point and/or the third point of the lever arm may be movable by means of the lever arm comprising a threaded rod and the second or third point of the lever arm having corresponding threads. Thereby, the second point and/or the third point of the lever arm may be efficiently movable along the lever arm such that a counter force exerted by the counter force device on the string efficiently is adjustable.

The optical instrument may be a camera.

The harness may comprise shoulder straps and a waist belt. Thus, the device may efficiently be carried by a user.

According to another aspect, there is provided a use of the device according to the first aspect for carrying of an optical instrument.

According to another aspect, there is provided a camera system, the system comprising a holding device as described above, and a camera.

Further features of, and advantages with, the present invention will become apparent when studying the appended claims and the following description. The skilled person will realise that different features of the present invention may be combined to create embodiments other than those described in the following, without departing from the scope of the present invention.

BRIEF DESCRIPTION OF DRAWINGS

FIG. 3 FIG. 2 illustrates an adjustable counter force devise according to an embodiment.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The device is efficient for carrying and using of various optical instruments with minimised effort of the user of the device.

With optical instruments as used herein is intended any optical instrument suitable to be carried by a person. An optical instrument may be of any type, including instruments suitable for viewing of objects and/or recording of images, including cameras, such as still cameras, film cameras, TV-cameras, binoculars, surveying equipment, and/or the like.

An embodiment will now be discussed with reference to the FIGS. 1 and 2. The discussions are made for the sake of clarifying and exemplifying embodiments of the invention. The figures and details of the figures are schematically illustrated.

Figure 1:
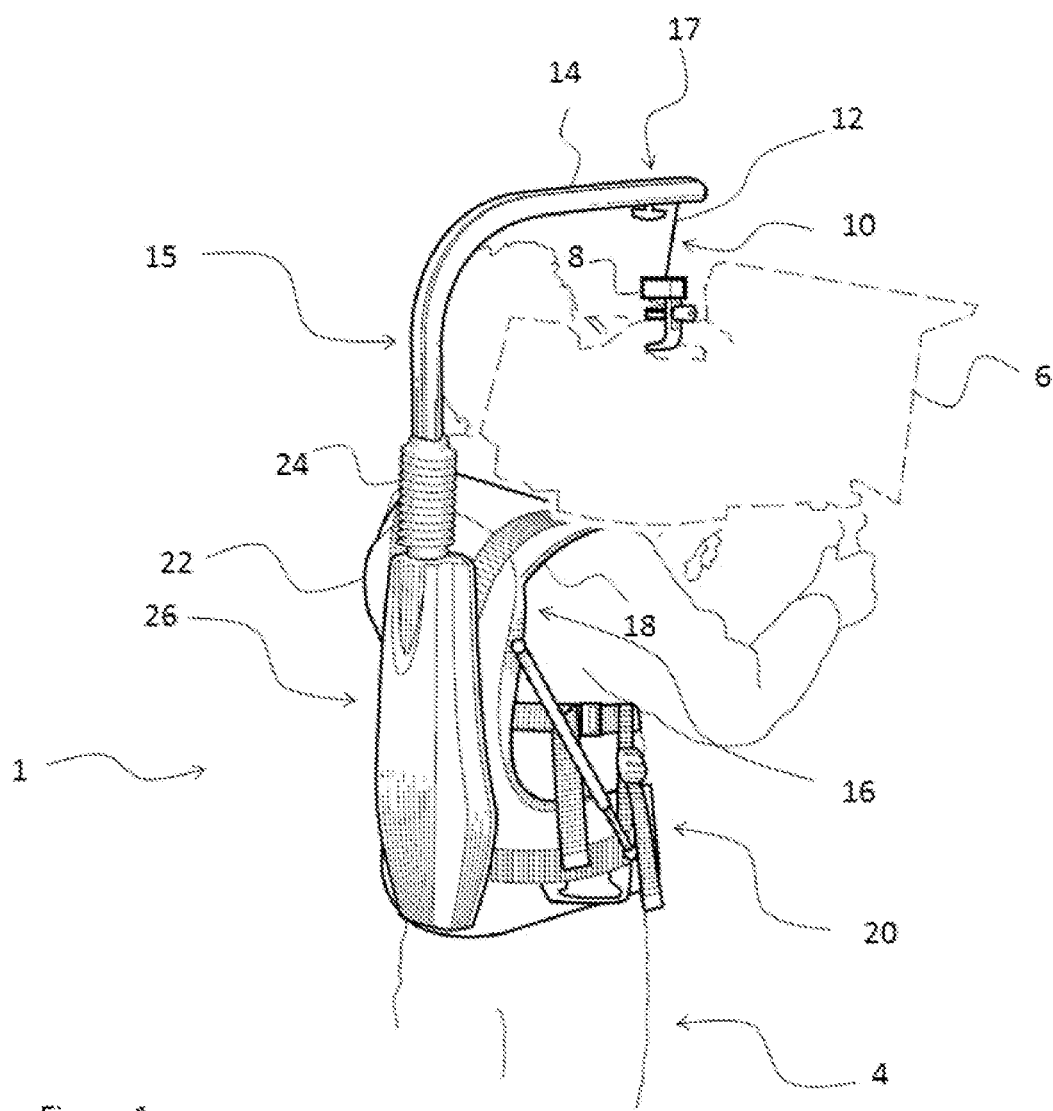
FIG. 1 illustrates an embodiment of the invention.

FIG. 1 illustrates a device 1 for carrying an optical instrument 6. To improve the understanding, the device 1 is depicted as carried by a user 4 of the device 1. The device comprising a harness 16, an arm 14, and an extendable string 12. The arm 14 comprises a first portion 15 being fixed in relation to the harness 16, and a second portion 17 for supporting of the string 12. The string 12 comprises a first portion 10 arranged for fastening of the optical instrument 6, and a second portion 11 (illustrated in FIG. 2). The device 1 further comprises an adjustable counter force device 26, and the second portion 11 of the string 12 is attached to the adjustable counter force device 26 for providing a counter force on the string 12. Although not illustrated in FIG. 1, but in FIG. 2, the adjustable counter force device 26 may comprise a spring, a lever arm, and a support, for example where the lever arm comprises a first point pivotably attached to the support, a second point attached to the string 12, and a third point attached to a second point of the spring. A first point of the spring may be pivotably attached to the support, and the second point and/or the third point of the lever arm may be movable along the lever arm such that a counter force exerted by the counter force device 26 on the string 12 is adjustable.

In this example, illustrated by FIG. 1, the device 1 is illustrated carrying an optical instrument 6 of a camera type. The camera 6 is fastened to the device 1 by means of a fastener 8 attached to a first portion 10 of the string 12. The fastener 8 may, for example, be a snap-lock fastener or any type of suitable fastening device. It is realised that a fastener may not be necessary and that the string may be, for example, tied to the optical instrument. The string 12 is supported by the arm 14 of the device 1. The shape of the arm 14 may, as illustrated, resemble an L turned upside-down, such that the arm 14 is attached to the harness in the back or shoulder region of the user 4 while allowing the camera 6 to be supported by the arm 14 in a position suitable for footage, in this example over the right shoulder of the user. The arm 14 may be telescopic, to enable adjustments to the height and/or length of arm 14, for example to suit a variety of users 4 and/or cameras 6. In the illustrated embodiment, the string 12 partly is positioned inside the arm 14. It is realised that the string 12 also may be positioned on the outside of the arm, for example, by means of one or more hooks or loops attached to the arm 14. The arm 14 may be made of a rigid material such as, for example, materials comprising or consisting of metal, for example aluminium, metal alloy, polymer, glass fibre, carbon fibre, or wood, or any other suitable material. The string may be any suitable type of string such as, for example, a metal wire, a polymeric string, a string made of natural, synthetic or composite fibres, or any other type of string suitable for the device.

In this example, the harness 16 comprises shoulder straps 18, a waist belt 20, and a back portion 22. It is realised that the harness may be provided in a plurality of different forms. One example purpose of the harness is to convey weight from the optical instrument to the body of the user of the device. The harness may comprise shoulder straps 18 and a waste belt 20 enable weight to be transferred from the optical instrument to the shoulders and/or waste or hips of the user 4. Thus, it is realised that the harness may take many various suitable forms within the scope of the invention. For example, the harness may comprise shoulder straps 18, and a waist belt 20.

If the user 4 desires to change the position of the camera 6, he may, for example, elevate the camera whereby the string 12 would be retracted by action of the adjustable counter force device 26. If the user 4 desires to change the camera position by lowering the camera 6, the string 12 would be extended. Other types of adjustments to the camera may result in extension or retraction of the strap 12. It is realised that the optical instrument 6 may be tilted essentially without extending or retracting the string 12. The action of the adjustable counter force device when the string 12 is extended or retracted is further explained with reference to FIG. 2.

Figure 2:
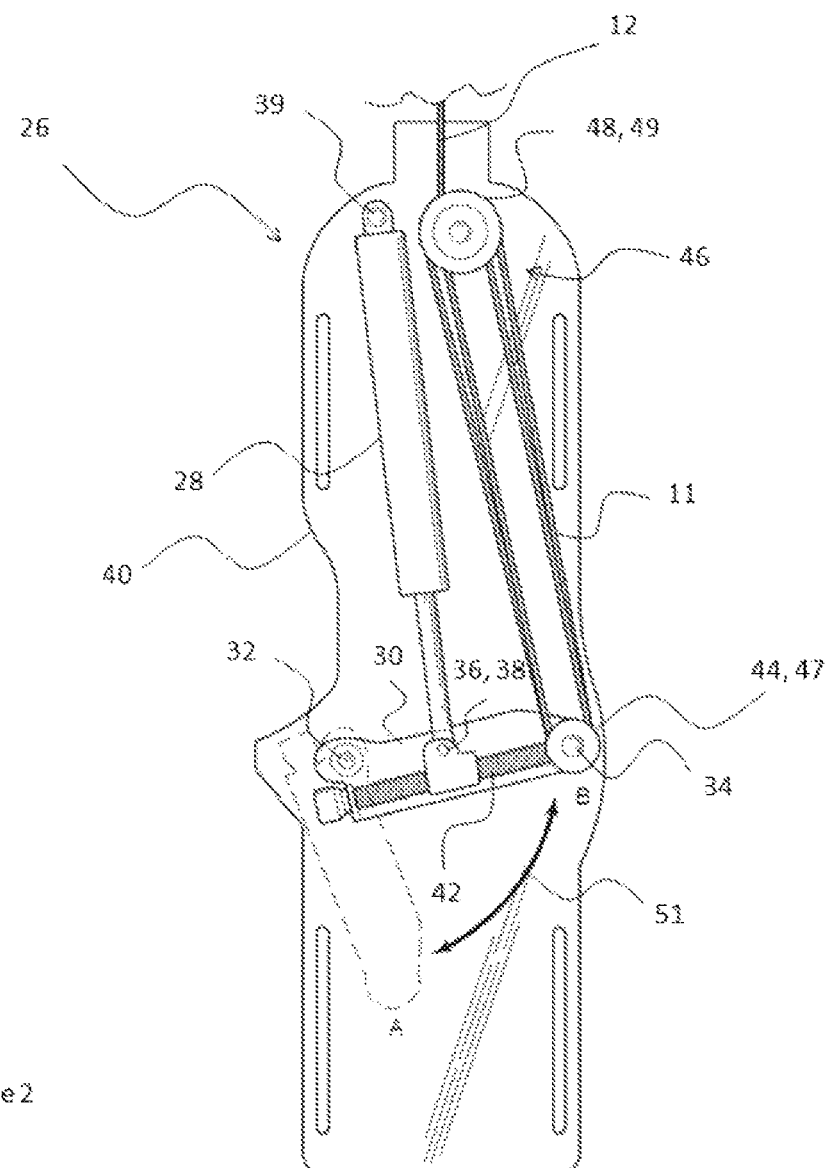
FIG. 2 illustrates an adjustable counter force devise according to an embodiment.

With reference to FIG. 2 an adjustable counter force device 26 will now be discussed. It will be understood that the adjustable counter force device 26 provides a force on the strap which may balance, or take up a major part, of the weight of the optical instrument 6, such that the user 4 may not have to carry a major part of the camera weight by his arm and/or one of his shoulders. For example, a relatively substantial portion of the weight may instead be transferred to the body of the user 4 via the harness 16. Even though the harness 26 may transfer weight to the shoulders of the user 4, for example via the shoulder straps 18, the weight may be divided between both shoulders, thus minimising discomfort and risks of injuries. Further, a waist belt of the harness can transfer weight to the hips of the user, thus relieve the shoulders from weight. The adjustable counter force device 26 may be adjusted such that it can take a relatively substantial portion of the weight of the optical instrument. For example, in some embodiments the adjustable counter force device 26 may be adjusted such that it takes essentially all of the weight of the optical instrument. Further, the adjustable counter force device 26 may comprise a spring 28, for example to allow the string 12 to be extended and/or retracted, thus allowing for adjustments of the position of the camera, for example by lowering or elevating the optical instrument 6. When adjusting the position of the camera such that the string 12 is extended, the spring can act to provide a force assisting the returning of the position of the camera 6 during retraction of the string 12. Yet further, when adjusting the position of the camera 6 by elevating the camera 6, the spring can act to provide a force assisting the elevating the camera 6.

The adjustable counter force device 26, which may comprise a lever arm 30, can be adjusted such that the counter force provided is suitable for supporting a wide range of weights of the optical instrument 6 as will be explained. The adjustable counter force device 26 may include a spring 28, in this example a gas spring of the compression type, a lever arm 30, and a support 40. The lever arm 30 comprises a first point 32 pivotably attached to the support 40, such as, for example, attached by means of a rivet or a screw, a second point 34 attached to the string 12, and a third point 36 attached to a second point 38 of the spring. For example, a first point 39 of the spring may be being pivotably attached to the support. The support may be, for example, a plate made of, for example, metal, a polymeric or a composite material or combinations thereof. In the illustrated embodiment, the third point 36 of the lever arm 30 may be movable along the lever arm such that the counter force exerted by the counter force device 26 on the string 12 is adjustable. In an example, the second point 34 of the lever arm 30 may be movable. It is realised that both the first and second points 34, 36 of the lever arm 30 may be movable. The, thus, provided adjustability allows for efficient adjustments to the counter force such that the counter force may be adjusted to the weight of the optical instrument, or if the user 4 of the device 1 changes the optical instrument to an optical instrument with different weight such that the different weight may be balanced.

For the sake of explanation of the adjustability and the counter force provided by the adjustable counterforce device 26, it is now assumed that the third point 36 of the lever arm 30 is movable and that the second point 34 of the lever arm 30 is fixed in relation to the lever arm. When an optical instrument is fastened and carried by the device 1, the string 12 may be extended by an anti-clockwise pivoting movement of the lever arm 30, as indicated in FIG. 2 by the curved arrow 51, until the energy build up in the compressed spring corresponds to the weight of the optical instrument 6. The phantom illustration A of the lever arm (indicated by a dotted line) illustrates a state of the lever arm as discussed with reference to FIG. 3. If the optical instrument 6 is too heavy or too light for the settings of the adjustable counter force device 26, the counter force may be increased by adjusting the third point 36 of the lever arm 30. It will now be assumed that the adjustment made to the adjustable counter force device 26 is suitable for balancing the weight of the optical instrument 6. If the string 12 is further extended, such as by pulling of the string 12 when adjusting the position of the optical instrument 6, the lever arm 30 will further pivot anti-clockwise, thus involving a movement of the second point 34 of the lever arm 30 upwards in the figure resulting in a compression of the spring 28 whereby further energy will be stored in the spring. This further stored energy can be utilised, for example, in assisting the optical instrument 6 to return to its previous state or assist in any repositioning of the optical device 6 under retraction of the string. It is further understood that repositioning of the optical instrument such that the string 12 is retracted is assisted by energy build up in the spring. If the user replaces the optical instrument for another instrument having a higher weight, the distance between the second and third points of the lever arm 30 may be reduced to provide a higher counter force to the optical instrument 6, without risking of the optical instrument to reach a too low position or to risk that the spring is fully compressed before providing a high enough counter force. If a light weight optical instrument is used, the distance between the second and third points 34,36 of the lever arm 30 may be increased.

Adjusting the lever arm may be performed, for example, by means of the lever arm 30, which may comprise a threaded rod 42 and the second or third point 34, 36 of the lever arm having corresponding threads. Thereby, by rotating the threaded rod 42 around its longitudinal axis the second or third point 34, 36 of the lever arm 30 can be adjusted along the lever arm 30. It is realised that a threaded rod with one part having threads in one direction may be in contact with one of the second and third points 34,36 of the lever arm 30 having corresponding threads, and another part of the threaded rod having threads in the opposite direction, as compared to the one part of the threaded rod, is in contact with the other one of the second and third points 34,36 of the lever arm 30 to enable efficient adjustments of both the first and second points 34,36 of the lever arm 30 simultaneously by rotating the threaded rod 42.

As illustrated in FIG. 2, the adjustable counter force device 26 may have a pulley system 46, thus allowing the length of the rope being extended or retracted to be longer that the distance with which the spring 28 is compressed or decompressed. Such a pulley system 46 may be realised in a plurality of different versions. In this example, the string 12 turns 540 degrees in the pulley system 46. For example, the string may turn 180 degrees or more, and the turning may be for example n·180 degrees, wherein n may be 1 or greater (e.g., n may be an integer of one or higher). In this example, the pulley system 46 may have four wheels, a first wheel 44, a second wheel 48, a third wheel 47, and a fourth wheel 49. The third wheel 47 maybe behind the first wheel 44 in the illustration, and the fourth wheel 49 may be behind the second wheel 48 in the illustration. The string 12 may be attached to the second point 34 of the lever arm, for example by means of the first wheel 44 being rotatably attached to the lever arm. The first wheel 44 may be part of the pulley system 46 further comprising the second wheel 48 rotatably attached to the support 40, the third wheel 47 rotatably attached to the lever arm 30, and the fourth wheel 49 rotatably attached to the support 40. In the illustrated pulley system 46, the string 12 may be attached to the adjustable counter force device 26 by contacting the pulley system 46 adjacent to the second wheel 48 and continuing from there to the first wheel 44 at the second point of the lever arm 30 at which first wheel 44 the string turns 180 degrees and returns to the second wheel 48 where the string 12 turns 180 degrees to the third wheel 47 where the string 12 turns another 180 degrees to the fourth wheel 48 where the string 12 is secured. In this embodiment, the pulley system may be realised by means of four, the first, second, third, and fourth, wheels, although it is realised that a pulley system with a different number of wheels may be used. It is further realised that the wheels in the pulley system 46 have some suitable means for positioning the string 12 around the wheels 44, 48, such as, for example, by the wheels having grooves (not illustrated) for this purpose.

It is understood from this discussion and with reference to FIGS. 1 and 2, that when the user 4 readjusts the optical instrument, for example a camera 6, such that the string is extended, the lever arm 30 can pivot around the first point 32 of the lever arm and the spring 28 will be compressed, thus allowing the string 12 to be extended and providing a force to the string 12 which will assist the user 4 to return the optical device 6 under retraction of the string 12.

Figure 3:
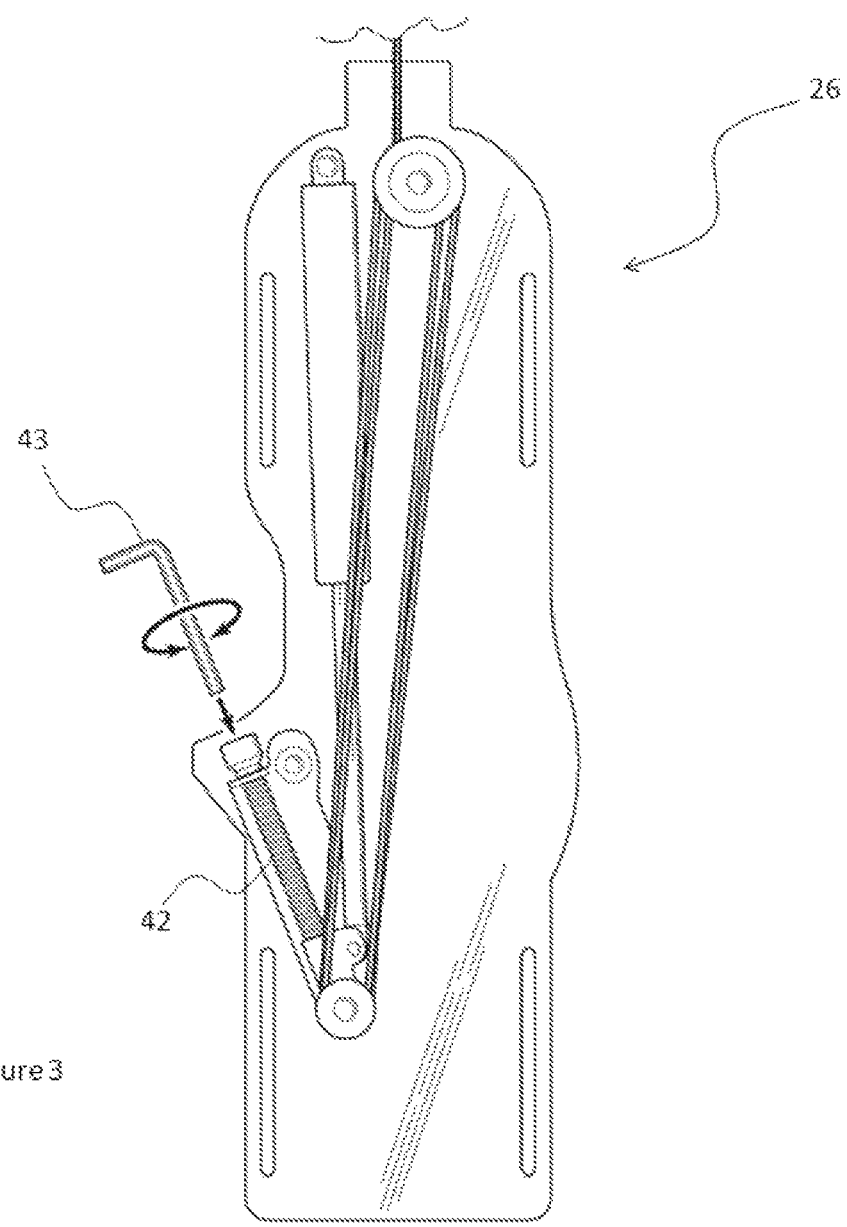

FIG. 3 illustrates how the adjustable counterforce device 26 illustrated in FIG. 2 may be adjusted to the weight of an optical instrument by rotation of the threaded rod 42 by means of a tool 43.

It will also be understood, although not illustrated, that the spring may be of an extension type and mounted such that it is extended instead of compressed when the string 12 is extended. The attachment point 39 may for such a case be positioned below the lever arm and the spring 28 turned upside down as compared to the illustration of FIG. 2.

The device may be suitable for carrying of a camera suitable to be carried on or above a shoulder of the user 4.

According to an embodiment, the device may be used with an optical instrument, such as a camera, with a weight of 1 to 50 kg, for example 2 to 30 kg, and in some embodiments 3 to 15 kg.

Additionally, even though the invention has been described with reference to specific exemplifying embodiments thereof, many different alterations, modifications and the like will become apparent for those skilled in the art. Variations to the disclosed embodiments may be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A device comprising:
   a harness;
   an arm;
   a string, wherein the arm comprises a first portion being fixed in relation to the harness, and a second portion for supporting of the string, and the string comprises a first portion and a second portion, the first portion of the string being arranged to fasten to one or more instruments; and
   an adjustable counter force device, wherein the second portion of the string is attached to the adjustable counter force device in order to provide a counter force on the string, and the adjustable counter force device comprises:
   a spring,
   a support,
   a lever arm, wherein the lever arm comprises a first point pivotably attached to the support, a second point attached to a first point of the string, and a third point attached to a second point of the spring, wherein a first point of the spring is pivotably attached to the support, and the second point and/or the third point of the lever arm is configured to be movable along the lever arm such that a counter force exerted by the counter force device on the string is adjustable.

2. The device according to claim 1, wherein the adjustable counter force device further comprises a pulley system comprising at least one wheel through which the string is positioned.

3. The device according to claim 1, wherein the spring corresponds to a gas spring.

4. The device according to claim 1, wherein the spring corresponds to an extension spring or a compression spring.

5. The device according to claim 1, wherein the second point and/or the third point of the lever arm are configured to be movable via one or more threads.

6. The device according to claim 1, wherein the second point and/or the third point of the lever arm is configured to be movable based on the lever arm comprising a threaded rod and the second or third point of the lever arm having corresponding threads.

7. The device according to claim 1, wherein the one or more instruments comprise a camera.

8. The device according to claim 1, wherein the harness comprises shoulder straps and a waist belt.

9. A method of using an optical instrument holding device, the method comprising:
   fastening the optical instrument to a first portion of a string, wherein a second portion of the string is attached to an adjustable counter force device in order to provide a counter force on the string; and
   utilizing a harness, wherein the harness is operally connected to an arm, the arm comprises a first portion being fixed in relation to the harness, and a second portion for supporting of the string,
   adjusting the counter force applied to the string by moving a lever arm of the counter force device such that the lever arm pivots relative to a support via at least a second point attached to a first point of the string and a third point attached to a second point of a spring, wherein a first point of the spring pivots relative to the support, and the second point and/or the third point of the lever arm moves along the lever arm.

10. The method according to claim 9, wherein adjusting the counter force is performed using pulley system comprising at least one wheel through which the string is pulled.

11. The method according to claim 9, wherein the second point and/or the third point of the lever arm are moved using one or more threads.

12. The device according to claim 1, wherein the second point and/or the third point of the lever arm are moved via the lever arm comprising a threaded rod and the second or third point of the lever arm having corresponding threads.

13. A camera system, the system comprising:
 a camera;
 a harness;
 an arm;
 a string, wherein the arm comprises a first portion being fixed in relation to the harness, and a second portion for supporting of the string, and the string comprises a first portion and a second portion, the first portion of the string being arranged to fasten to the camera; and
 an adjustable counter force device, wherein the second portion of the string is attached to the adjustable counter force device in order to provide a counter force on the string, and the adjustable counter force device comprises:
 a spring,
 a support,
 a lever arm, wherein the lever arm comprises a first point pivotably attached to the support, a second point attached to a first point of the string, and a third point attached to a second point of the spring, wherein a first point of the spring is pivotably attached to the support, and the second point and/or the third point of the lever arm is configured to be movable along the lever arm such that a counter force exerted by the counter force device on the string is adjustable.

14. The system according to claim 13, wherein the adjustable counter force device further comprises a pulley system comprising at least one wheel through which the string is positioned.

15. The system according to claim 13, wherein the spring corresponds to a gas spring.

16. The system according to claim 13, wherein the spring corresponds to an extension spring or a compression spring.

17. The system according to claim 13, wherein the second point and/or the third point of the lever arm are configured to be movable via one or more threads.

18. The system according to claim 13, wherein the second point and/or the third point of the lever arm is configured to be movable based on the lever arm comprising a threaded rod and the second or third point of the lever arm having corresponding threads.

19. The system according to claim 13, wherein the harness comprises shoulder straps and a waist belt.

* * * * *